PIER CONSTRUCTION METHOD

Filed March 25, 1954 6 Sheets-Sheet 1

INVENTOR.
Ben C. Gerwick
BY
Flehr and Swain
ATTORNEYS

Nov. 17, 1959 B. C. GERWICK 2,912,828

PIER CONSTRUCTION METHOD

Filed March 25, 1954 6 Sheets-Sheet 2

INVENTOR.
Ben C. Gerwick

BY
Flehr and Swain
ATTORNEYS

PIER CONSTRUCTION METHOD

Filed March 25, 1954 6 Sheets-Sheet 3

INVENTOR.
Ben C. Gerwick

BY Fleher and Swain

ATTORNEYS

Nov. 17, 1959 B. C. GERWICK 2,912,828

PIER CONSTRUCTION METHOD

Filed March 25, 1954 6 Sheets-Sheet 4

INVENTOR.
Ben C. Gerwick
BY
Flehr & Swain
ATTORNEYS

INVENTOR.
Ben C. Gerwick
BY Fleher & Swain
ATTORNEYS

Nov. 17, 1959 B. C. GERWICK 2,912,828

PIER CONSTRUCTION METHOD

Filed March 25, 1954 6 Sheets-Sheet 6

INVENTOR.
Ben C. Gerwick

BY Flehr & Swain

ATTORNEYS

United States Patent Office 2,912,828

Patented Nov. 17, 1959

2,912,828

PIER CONSTRUCTION METHOD

Ben C. Gerwick, Berkeley, Calif., assignor to Ben C. Gerwick, Inc., San Francisco, Calif., a corporation of California Application March 25, 1954, Serial No. 418,600

1 Claim. (Cl. 61—52)

This invention relates generally to piers or like structures, and to methods for the construction of the same.

This application is a continuation-in-part of application Serial No. 368,901, filed July 20, 1953, and now abandoned.

In many instances where it is desired to erect a pier upon an underwater formation, to serve for example as the sub-structure of a bridge, it is possible to eliminate the use of conventional caissons, and to secure the bases of the pier columns to piles which are driven into the underlying formation. The present invention pertains to pier constructions and methods of this character, and particularly it is an object of this invention to provide a procedural method which is economical from the standpoint of overall cost, and which enables progressive erection of piers in accordance with a predetermined and favorable time schedule.

Another object of the invention is to provide a pier construction and method of the above character which avoids the use of temporary mats made of timbering or the like buoyant material, and such as have been used in the past.

Another object of the invention is to provide a pier construction and method of the above character which facilitates erection of a pier in conformance with specification requirements as to loads and stresses.

Another object of the invention is to provide a pier structure of the above character in which the template means used for driving the piles into the underlying formation becomes a permanent base part of the pier structure.

Another object of the invention is to provide a pier structure of the above character in which the certain sections used in pouring the concrete constitute an integral part of the pier structure and take a substantial portion of the stresses applied to the pier.

Additional objects and features of the invention will appear from the following description in which the preferred embodiments have been set forth in detail in conjunction with the accompanying drawing.

Referring to the drawing.

Figures 1, 2, 3, 4:
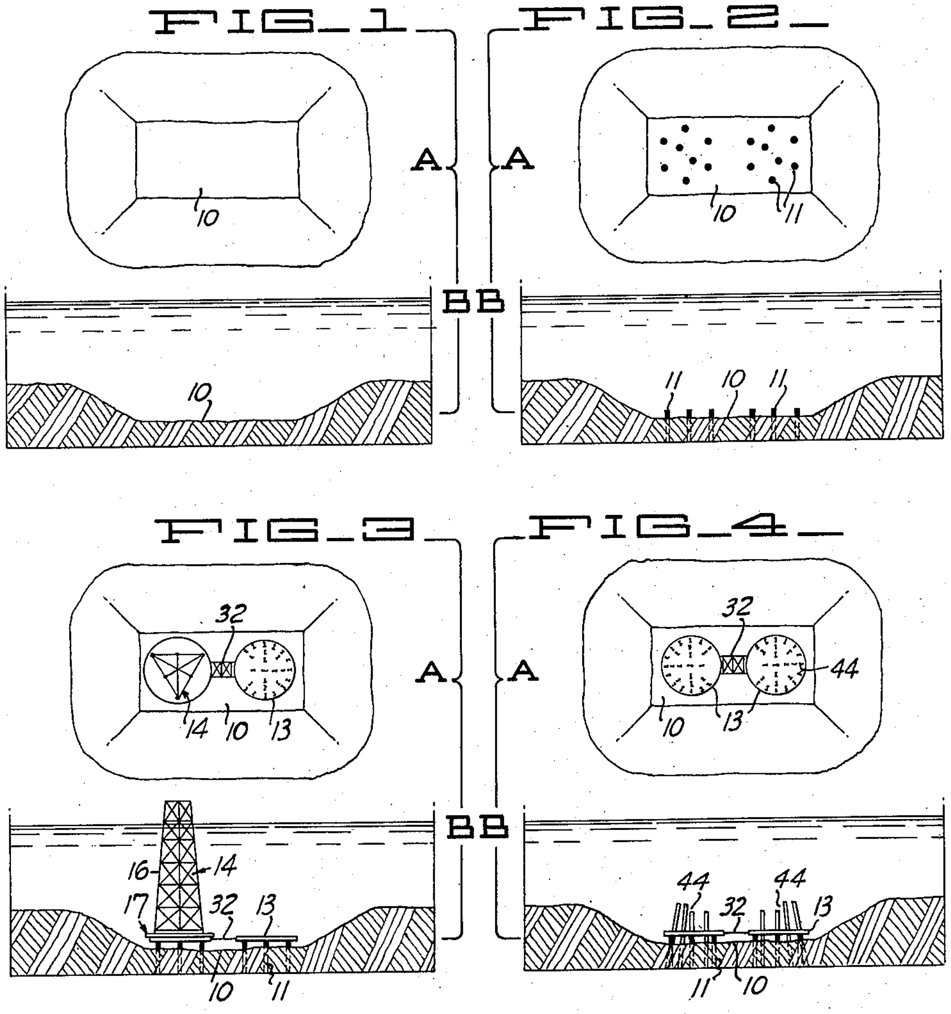
Figure 1A is a plan view of the pier site after dredging has been completed.
Figure 1B is an elevation view of the pier site shown in Figure 1A.
Figure 2A is a plan view of the pier site after falsework piles have been driven and after they have been cut off to the desired height.
Figure 2B is an elevation view of the pier site shown in Figure 2A.
Figure 3A is a plan view of the pier foundation with the base grids in place on the falsework piles.
Figure 3B is an elevation view of the pier foundation shown in Figure 3A showing the detachable sighting tower still attached to one of the base grids.
Figure 4A is a plan view of the pier foundation after the steel H-piles have been driven.
Figure 4B is an elevation view of the pier foundation shown in Figure 4A.

The procedure used for the erection of my pier can best be understood by reference to Figures 1 to 9 inclusive. Assuming that the pier is to be erected upon an underwater formation, the site of the pier is first prepared as indicated in Figures 1A–B, as by dredging, to provide a substantially flat area 10 which is somewhat greater than the bottom area of the pier to be erected.

The next step illustrated in Figures 2A–B, is to drive a number of falsework piles 11 into the formation. These piles are cut off to an even height, and serve to provide a temporary support for the reinforced base grids which are subsequently provided. The piles are grouped in any convenient way to support the grids, such as the grouping illustrated in Figure 2A. The distance between centers of the two groups of piles illustrated in Figure 2A corresponds roughly to the distance between centers of the columns of the pier to be erected.

Following the preparation of the falsework piles as illustrated in Figures 2A–B, a pair of reinforced concrete base grids 13 are placed upon the falsework piles, and are aligned to conform to the vertical center lines of the vertical pier column. In Figures 3A–B one of the reinforced base grids is shown temporarily attached to the lower end of the base grid setting assembly 14. In practice, the grids are cast on shore, and are floated to the pier location on a suitable barge, and when it is desired to lower a grid onto the falsework piles 11, a base grid setting assembly 14 is temporarily attached to the base grid.

The base grid setting assembly consists of a sighting tower 16 which is attached to a pickup device 17 formed of a pair of cross-connected beams 18. Attachment of the sighting tower to the pickup device can be made by any suitable means such as welding.

Figures 17, 18:
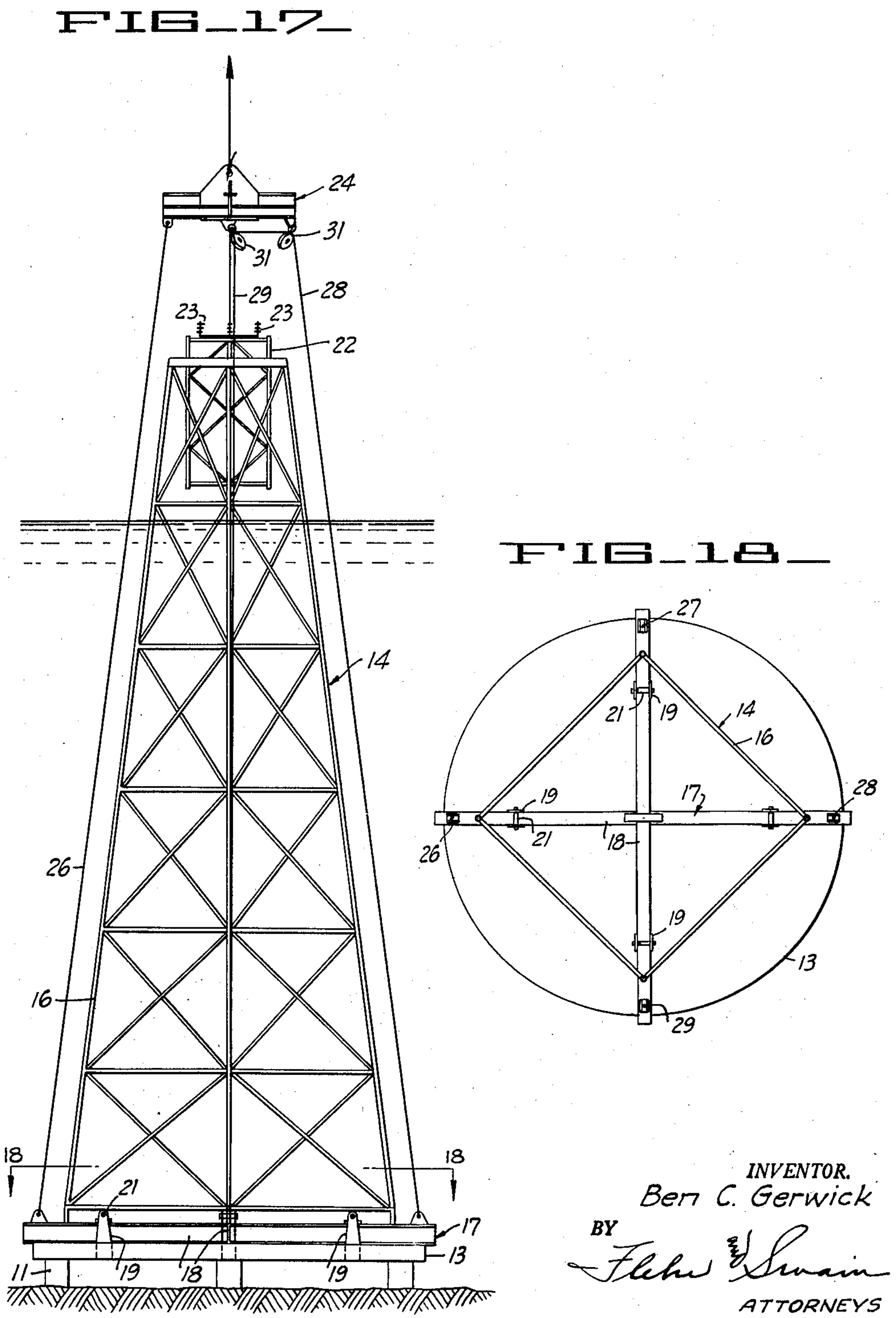
Figure 17 is an elevation view of the base grid setting assembly.
Figure 18 is a cross-sectional view taken along the line 18—18 of Figure 17.

The base grids 13 are provided with a plurality of lifting lugs 19 (Figure 18) which are adapted to receive the beams 18. Thus, when it is desired to lower a base grid 13, the base grid setting assembly 14 is attached to the base grid 13 by placing the beams 18 between the lifting lugs 19 and inserting pins 21 to hold the beams in place.

The sighting tower 16 is provided with a movable structure 22 fitted with sighting elements 23 that are centered over a predetermined point on the base grids 13. The structure 22 is movable in a vertical direction so that the sighting element can be raised or lowered.

Another suitable sighting device is shown in a copending application of an even date filed herewith and entitled "Plumbing Device."

A pickup spreader 24 is then attached to a crane or similar device on the barge and four lines, 26, 27, 28 and 29 are run from the pickup spreader 24 to the pickup device 17. Lines 26 and 27 are fixed lines whereas lines 28 and 29 are equalizer lines. A pair of pulleys 31 serve as load equalizers.

The base grid 13 together with the base grid setting assembly 14 is lowered to bring the grid to rest upon the falsework piles. The sighting elements 23 are then raised or lowered to a proper elevation and alignment of the base grid is checked by the sighting on the sighting elements 23. The grid is then shifted if necessary and alignment is rechecked. After the base grid has been found to be suitably placed, the pins 21 are removed and the entire base grid setting assembly 14 is lifted out of the water so that it can be attached to the next base grid to be lowered.

After each pair of base grids for a pier has been lowered and aligned on the falsework piles, they can be tied together by any suitable means such as by steel framework 32.

Figure 10:
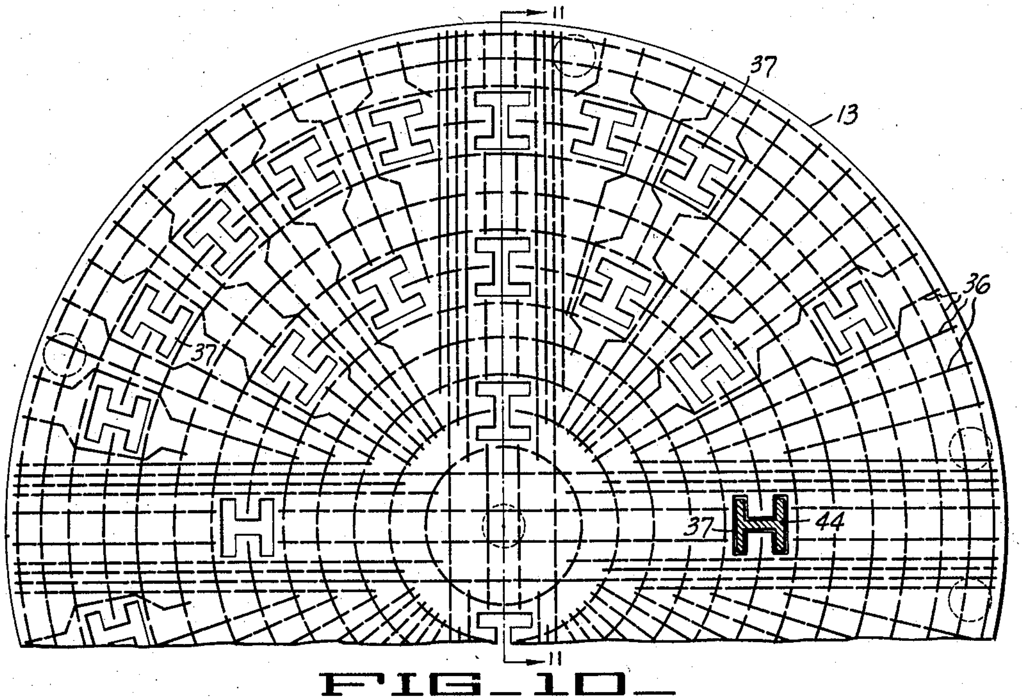
Figure 10 is a plan view of a portion of a base grid.

Figure 10 illustrates a suitable reinforced concrete base grid which can be used. Each base grid is circular as viewed in plan and is provided with metal reinforcement 36 to provide the desired strength. The grid is provided with a pattern of spaced pile slots 37, which in plan are contoured in accordance with the type of metal piling to be used. Assuming that structural steel H-piles are used, the pile slots are H-shaped as illustrated and are proportioned to provide ample clearance.

Figure 11:
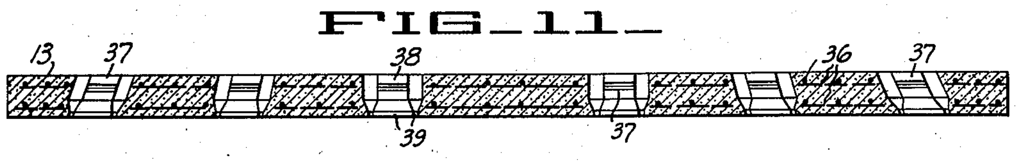
Figure 11 is a cross-sectional view taken along the line 11—11 of Figure 10.
Figure 14:
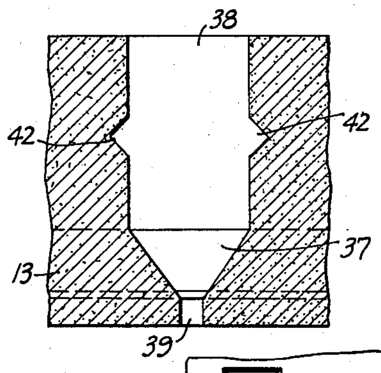
Figure 14 is a cross-sectional view taken along the line 14—14 of Figure 13.
Figure 13:
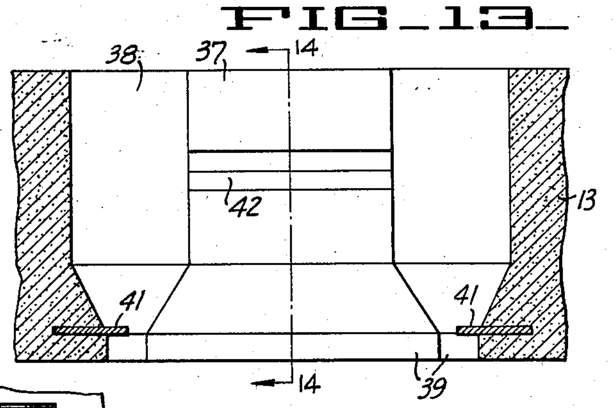
Figure 13 is a cross-sectional view taken along the line 13—13 of Figure 12.
Figure 12:
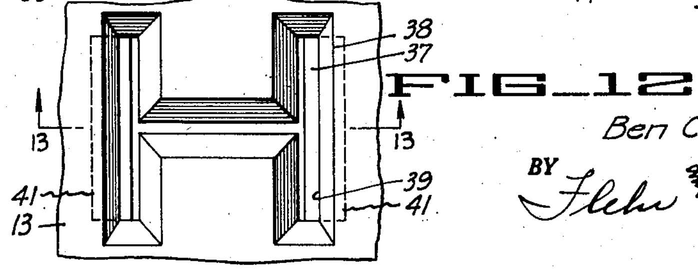
Figure 12 is a plan view of one of the pile slots nearest the center of the base grid.

The pile slots 37 are distributed in accordance with a predetermined pattern such as in the three concentric circles shown in Figure 10. In general, it is desirable to incline the axis of some of the pile slots from the vertical. For example, it can be seen in Figure 11 that the axis of the pile slots in the inner concentric circle are vertical whereas the axis of the pile slots on the outer concentric circles are inclined from the vertical to cause the lower extremities of the load bearing piles to be spaced over a larger area of the load supporting strata.

It has been found desirable to form the pile slots 37 so they have larger openings at the top than they do at the bottom. The larger openings 38 of the pile slots 37 facilitate the initial placement of the piles into the pile slots 37 whereas the smaller openings 39 tend to prevent the entrance of mud into the pile slots while the piles are being driven.

Additional means may be used to prevent the entrance of mud into the pile slots 37. It has been found to be desirable to imbed gasket-like members 41 into the concrete of the base grid 13. These gasket-like members 41 can be formed of any siutable material such as a flexible metal or rubber. Thus when the piles are driven through the base grid 13, the members 41 will be deflected but will still maintain contact with the piles to prevent entrance of mud into the pile slots.

The pile slots 37 are also provided with notches 42 for a purpose hereinafter to be described.

Because there is a predetermined pattern in the distribution of the pile slots 37, to conform with the pier specifications, proper positioning of the base grids includes their proper axial location, whereby the subsequently driven piles will be positioned in the desired manner.

Following proper positioning of the grids 13 and the tying together of each pair of grids for each pier, the permanent load bearing piles 44 are driven through the various pile slots 37. These piles can be H-shaped as previously described, and they are driven to a suitable depth to conform to specifications and to provide an adequate load bearing support for the pier. In Figures 4A–B a number of load bearing piles 44 are shown after they have been driven, and it will be noted that the upper ends of these piles extend a considerable distance above the base grids 13. During the driving of the piles 44, the alignment of the base grids 13 is not disturbed to any substantial extent.

After all of the load supporting piles 44 have been driven, all of these piles may be securely bonded to the base grids 13 or if desired, the bonding may be confined to the outer ring of piles. This bonding is accomplished by introducing grouting into the spaces between the piles 44, and the associated pile slots 37. Previous to introducing the grouting, the openings can be cleared of any mud or other foreign material which may be present. Application of grouting in this fashion is a simple underwater operation which can be performed by divers.

When the grouting has set and hardened it forms a firm bond between the piles and each reinforced concrete base grid and the notches 42 serve to increase this bond. This bond is such that in the subsequent complete pier construction the grids become a part of the completed pier structure, and particularly an essential part of the load supporting bases for the vertical pier columns.

In the succeeding operations hollow reinforced concrete base bells 46 comprised of lower cylindrical base sections 47 and upper conical base sections 48, are positioned upon the grids 13. The base bells 46 preferably are made in two separate sections which are separately positioned. The lower base sections for the piers are floated to the pier locations on a barge together with the guiding towers 49. The lower ends of the towers are temporarily attached to the lower base sections 47, after which the assemblies are lowered to seat the cylidrical sections in proper aligned position upon the base grids 13. Guide vanes 51 attached to the base grids (Figure 15) may be used to help in obtaining proper alignment.

Figure 5:
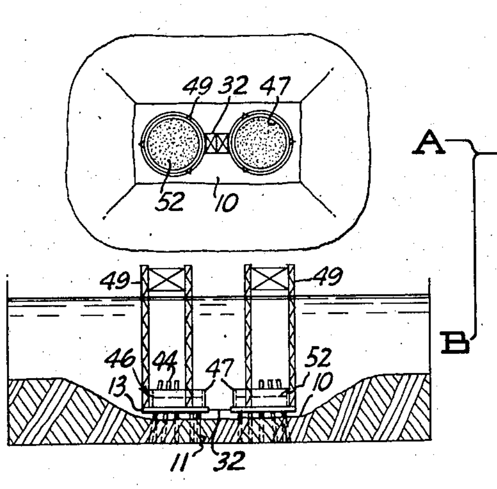
Figure 5A is a plan view of the pier foundation after the lower cylindrical base sections have been put in place and after the first pour of concrete has been made.
Figure 5B is an elevation view of the pier foundation shown in Figure 5A and shows the guide towers which are used to lower and align the lower cylindrical base sections.
Figure 15:
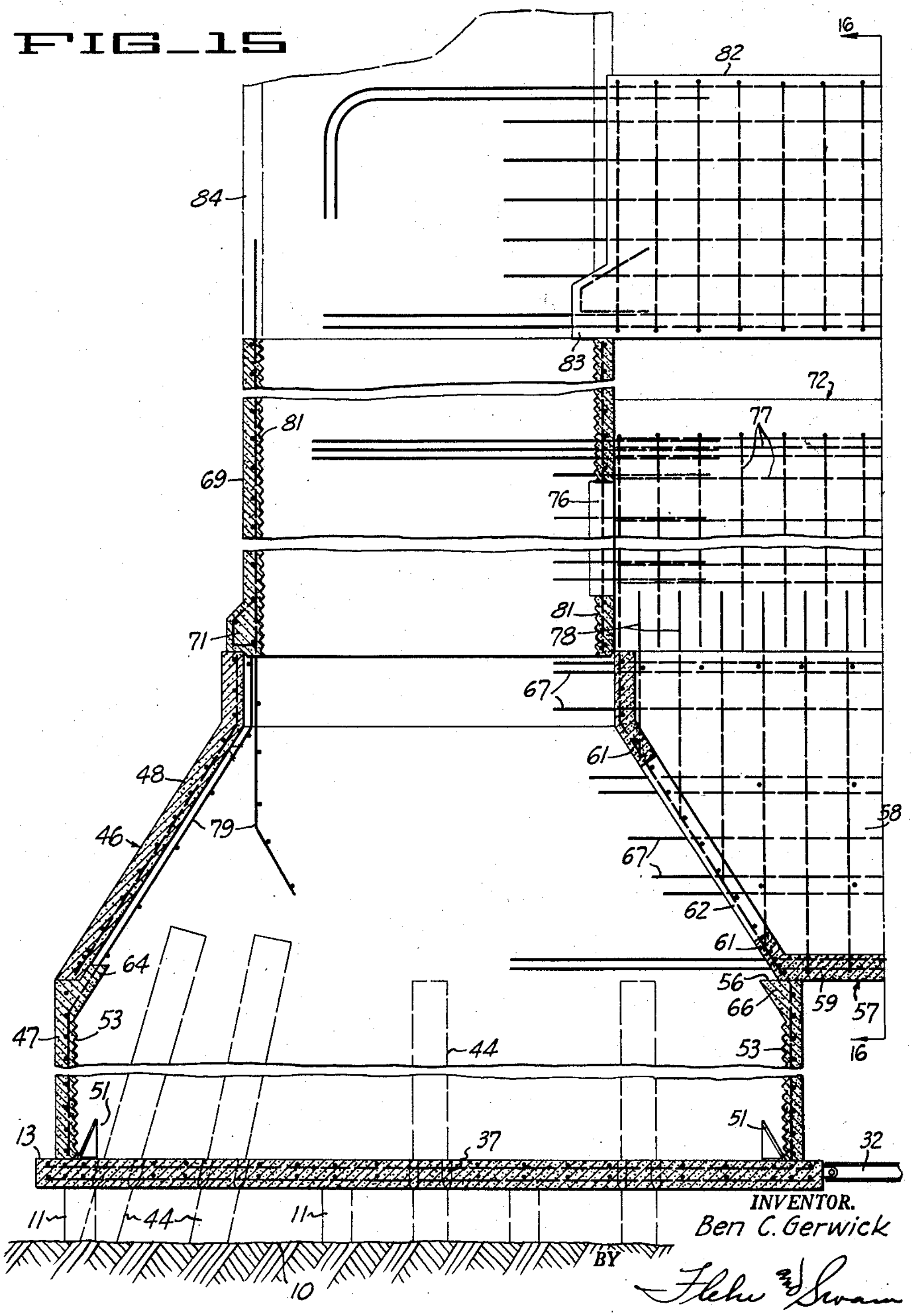
Figure 15 is a cross-sectional elevation view of a pier taken along the line 15—15 of Figure 16.

Assuming that the lower cylindrical base sections 47 have been properly positioned upon the base grids, the next operation is to provide a pour of concrete upon each base grid as shown in Figure 5 to provide an effective bond between the lower cylindrical section 47, the base grid 13 and the load supporting piles 44. This pour is indicated at 52 and is preferably placed by means of a tremie pipe. To increase the bond between the grid 13 and the cylindrical section 47 the upper surface of the grid can be roughened and the section 47 can be provided with corrugations 53 as shown in Figure 15.

Each of the upper conical base sections 48 is provided with a rectangular slot 56 (Figure 16), interrupting one side of the same, and which is provided to facilitate the placement of a lower diaphragm section 57. This lower diaphragm section is formed of precast reinforced concrete and is susbtantially U-shaped in cross section with side walls 58, a bottom wall 59 and end walls 61. The end walls 61 are provided with windows 62 to allow the passage of concrete from the upper base sections into the interior of the lower diaphragm section.

Supporting shoulders 64 and 66 are formed on the upper portions of the lower cylindrical base sections 47 to provide seats for the upper conical base section 48 and the lower diaphragm section 57.

Figure 16:
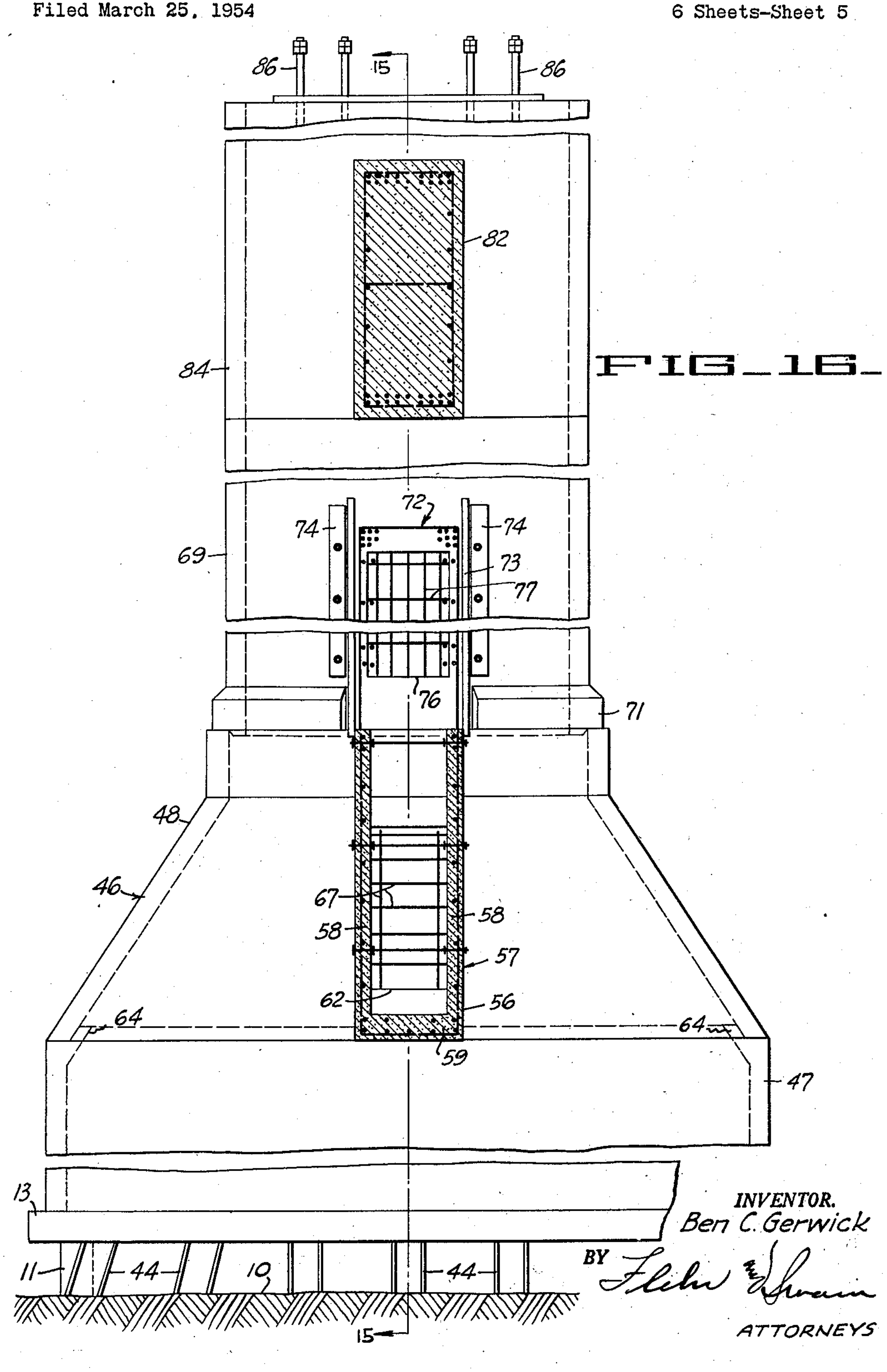
Figure 16 is a cross-sectional view taken along the line 16—16 of Figure 15.

Utilizing the tower 49 as suitable guide means, the upper conical base sections 48 are lowered onto the supporting shoulders 64 on the lower cylindrical base sections 47. After a pair of the upper base sections 48 have been properly positioned, a lower diaphragm section 57 is lowered and seated in the slots 56 in the sections 48 upon the shoulders 66. Reinforcing elements 67 to conform to the specification are now introduced into the base bells 46 and the diaphragm section 57. A suitable pattern of reinforcement is illustrated in Figures 15 and 16.

Figure 6:
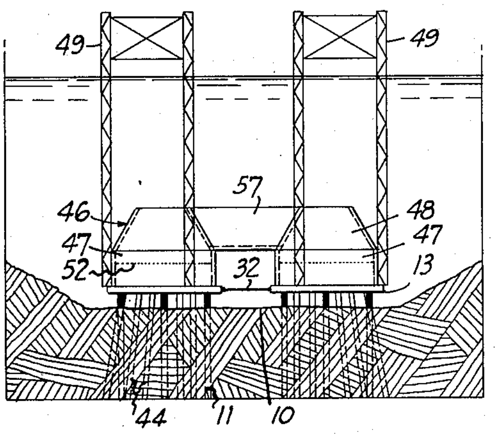
Figure 6 is an elevation view of the pier foundation after the upper conical base sections and the lower diaphragm section have been lowered through the towers and positioned upon the lower cylindrical base sections.

Assuming that the pier has been fabricated to the extent shown in Figure 6, hollow cylindrical reinforced concrete columnar sections 69 with suitable shoulders 71 formed on the lower portion thereof (Figure 15), are now seated upon the conical sections 48. Sections 69 are likewise cast on shore and are transported to the pier location by barge. While being lowered to final position they are aligned by the towers 49.

Figure 7:
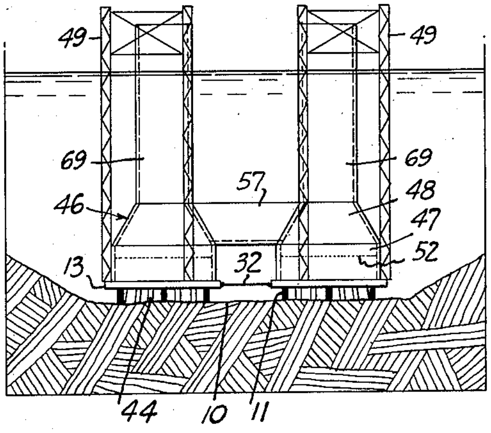
Figure 7 is an elevation view of the pier after the hollow columnar sections have been lowered through the towers and positioned upon the upper conical sections.

Following the positioning of the sections 69 in the manner illustrated in Figure 7, the towers 49 are disconnected from the base bells 46, and removed. The upper diaphragm sections 72 are poured in place and are situated just above the lower diaphragm sections 57. Any suitable forms may be used for casting the upper diaphragm sections 72 in place such as the Atlas "Speed Forms" 73 shown in Figure 16. These forms are held in place by suitable guides 74.

The space between the forms 73 of the upper diaphragm sections 72 is in communication with windows 76 provided in the columnar sections 69. Suitable reinforcing members 77 are placed within the diaphragm sections 72 and through the windows 76 and into the columnar sections 69 preparatory to the further pouring of concrete. A suitable pattern for this reinforcement is shown in Figures 15 and 16. Additional reinforcing members 78 are provided for interconnecting the upper and the lower diaphragm sections 57 and 72.

Suitable reinforcing patterns are shown in Figures 15 and 16 for providing reinforcement in the walls of sections 47, 48 and 69 and diaphragm sections 57 and 72.

Additional reinforcement is provided for bonding the columnar sections 69 to the upper conical base sections 48 and for bonding the upper conical base sections 48 to the lower cylindrical base sections 47. Preferably extensions 79 of the metal reinforcement used in the construction of the sections 47 and 69 (Figure 15) are used to secure an adequate bond between the respective sections. These extensions are suitably spaced from the walls of the adjacent sections before the concrete is poured. Corrugations 81 may be provided on the inner wall of the columnar section 69 to increase the bond to this section.

The next step is to fill the sections 47, 48 and 69, and also the diaphragm sections 57 and 72 with concrete. Preferably, this is carried out by the use of one or more tremie pipes. It is apparent that the use of tremie pipes is only necessary until the level of the poured concrete is above water and then the remainder of the pour can be made by conventional methods.

Figure 8:
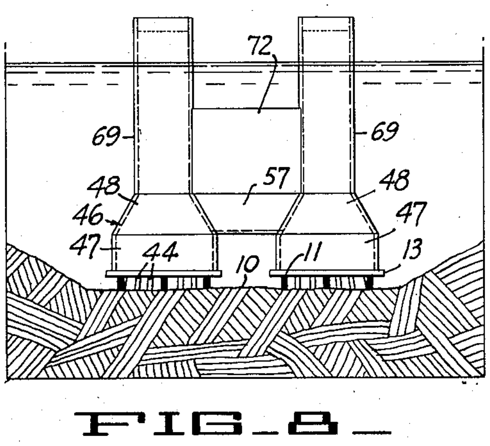
Figure 8 is an elevation view of the pier after the placement of the upper diaphragm section and after the second pour of concrete has been made.
Figure 9:
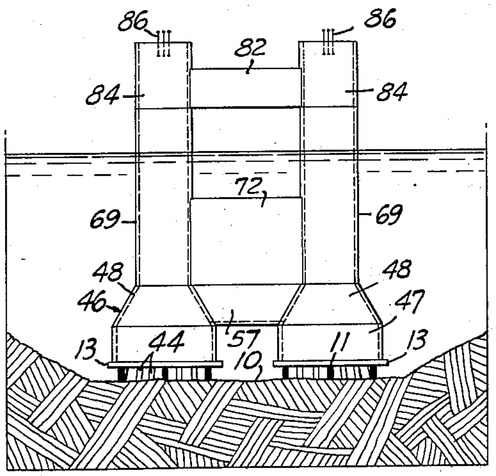
Figure 9 is an elevation view of the completed pier.

In some pier structures, it may be desirable to apply a top structure such as shown in Figure 9. Thus after filling the sections 69 as shown in Figure 8, a precast reinforced beam 82 having shoulders 83 is placed on top of the columnar sections 69. Suitable forms are built, and the top sections 84 are cast in place with suitable reinforcing. If desired, anchor bolts 86 may be imbedded in the concrete.

The final pier structure is anchored to and supported entirely by the load bearing piles 44. The bases of the vertical columns which transmit forces to the piles are formed in part by the base grids and the concrete masses which are bonded between the grids and the piles. The subsequent pours of concrete which are also bonded to the piles 44 and the base bells 46 also serve to form a base for the piers.

Because the sections 47, 48 and 69 are made of reinforced concrete, they serve to carry a relatively large percentage of the forces applied to the pier. In this connection the reinforcing extensions 79 projecting from the sections 47 and 69, aid in transmitting the stresses from the upper parts of the pier to the pier bases.

The procedure employed to carry out my invention greatly facilitates the erection of piers of the type supported by piling. Many of the essential concrete casting operations are carried out on shore, leaving only the application of tremie concrete for the underwater portion of the construction.

The piers constructed by this method can be easily aligned at all times and it has been found that the alignment of the finished piers is well within the requirements of conventional specifications.

I claim:

In a method for the construction of a pier of the type carried by an underwater formation, the steps of driving falsework piles into the formation, attaching a precast reinforced concrete base grid to one end of a tower, lowering the base grid and the tower into the water to position the grid on the falsework piling, the tower being of sufficient length to extend above the surface of the water, aligning said base grid by sighting on said tower, removing the tower from the base grid, driving load supporting piles through openings in the grid, filling the spaces between certain of the piles and the grid with cement grouting to form a load carrying bond between the grid and the piles to cause the grid to become a permanent integral part of the load supporting structure, attaching a permanent precast lower base section of reinforced concrete to one end of another tower, lowering the lower base section together with the tower into the water to position the lower base section upon the grid, the second tower extending above the surface of the water when the lower base section is in place and being dimensioned so that concrete sections may be lowered through the same, introducing concrete mix into the lower base section to form a bond between the lower base section and the grid and a further bond to the load supporting piles to cause said lower base section to become a permanent integral part of the load supporting structure, serving to carry a substantial portion of the load carried by the load supporting structure, lowering a permanent hollow upper base section of reinforced concrete through the tower and positioning the same upon the lower base section, lowering an additional permanent hollow section of reinforced concrete through the tower and positioning the same upon the upper base section, and then introducing additional concrete mix into the sections to fill the same to form a bond between the upper base section and the lower base section and another bond between the upper base section and the additional hollow section to cause the upper base section and the additional hollow section to become permanent integral parts of the load supporting structure serving to carry a substantial portion of the load carried by the load supporting structure.

References Cited in the file of this patent

UNITED STATES PATENTS

| | | |
|---|---|---|
| 457,438 | Hunt | Aug. 11, 1891 |
| 828,469 | Fowler | Aug. 14, 1906 |
| 930,974 | Koetitz | Aug. 10, 1909 |
| 1,542,037 | Cortes | June 16, 1925 |
| 1,952,380 | Leeman | Mar. 27, 1934 |
| 2,082,773 | Adams | June 8, 1937 |
| 2,317,016 | Allen | Apr. 20, 1943 |
| 2,317,017 | Allen | Apr. 20, 1943 |
| 2,675,680 | Emswiller | Apr. 20, 1954 |

FOREIGN PATENTS

| | | |
|---|---|---|
| 263,997 | Great Britain | 1927 |
| 507,487 | Belgium | Dec. 15, 1951 |

OTHER REFERENCES

Engineering News-Record of Mar. 4, 1954, pages 30, 31, 32.